US012570212B2

(12) United States Patent
Yamada et al.

(10) Patent No.: US 12,570,212 B2
(45) Date of Patent: Mar. 10, 2026

(54) OCCUPANT-LEFT-UNATTENDED WARNING DEVICE, OCCUPANT-LEFT-UNATTENDED WARNING SYSTEM, AND OCCUPANT-LEFT-UNATTENDED WARNING METHOD

(71) Applicant: Mitsubishi Electric Corporation, Tokyo (JP)

(72) Inventors: Atsuhiro Yamada, Tokyo (JP); Takumi Takei, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 42 days.

(21) Appl. No.: 18/835,357

(22) PCT Filed: Feb. 14, 2022

(86) PCT No.: PCT/JP2022/005528
§ 371 (c)(1),
(2) Date: Aug. 2, 2024

(87) PCT Pub. No.: WO2023/152936
PCT Pub. Date: Aug. 17, 2023

(65) Prior Publication Data
US 2025/0135994 A1 May 1, 2025

(51) Int. Cl.
*G08B 21/24* (2006.01)
*B60Q 9/00* (2006.01)
*G01S 13/04* (2006.01)

(52) U.S. Cl.
CPC ............... *B60Q 9/00* (2013.01); *G01S 13/04* (2013.01)

(58) Field of Classification Search
CPC ...... B60N 2/267; B60N 20/002; B60N 2/268; B60N 2210/40; B60N 2/272;
(Continued)

(56) References Cited

U.S. PATENT DOCUMENTS

2003/0222791 A1* 12/2003 Smalls ..................... B60Q 7/00
340/908
2007/0152615 A1* 7/2007 Newman ................ E05F 15/46
318/481
(Continued)

FOREIGN PATENT DOCUMENTS

JP 2000-185609 A 7/2000
JP 2018-163675 A 10/2018
(Continued)

OTHER PUBLICATIONS

International Search Report and Written Opinion mailed on Apr. 26, 2022, received for International Application No. PCT/JP2022/005528, filed on Feb. 14, 2022, 9 pages including English Translation.

*Primary Examiner* — Daniel Previl
(74) *Attorney, Agent, or Firm* — XSENSUS LLP

(57) ABSTRACT

An occupant-left-unattended warning device includes: a transmitter/receiver to transmit an electromagnetic wave in an interior, and receive a reception signal; an estimating unit to estimate whether an occupant in the interior is a warning-necessitating occupant using a first method, assess whether it is possible to confirm that the occupant is a warning-necessitating occupant; a supplementary assessing unit to supplementarily assess whether the occupant is a warning-necessitating occupant using a second method in a case where it is not possible to confirm that the occupant is a warning-necessitating occupant; a warning necessity/unnecessity assessing unit to assess whether an occupant-left-unattended warning is necessary or unnecessary on a basis of the assessment or supplementary assessment result; and a control unit to control an output device to give a warning in a case where it is assessed that the occupant-left-unattended warning is necessary.

9 Claims, 3 Drawing Sheets

(58) Field of Classification Search

CPC .. B60N 2/0021; B60N 2/0022; B60N 2/0025; B60N 2/0026; B60N 2/0029; B60N 2/26; B60N 2/266; B60N 2/269; B60N 2/28; B60N 2/2806; B60N 2/2809; B60N 2/2816; B60N 2/2887; B60N 2002/981; B60N 2210/12; B60N 2210/24; B60N 2230/20; B60N 2/0264; B60N 2210/18; B60N 2210/20; B60N 2210/26; B60N 2210/30; B60N 2/00; B60N 3/00; B60N 5/00; B60N 99/00; B60N 2205/00; B60N 2210/00; B60N 2220/00; B60N 2230/00; G08B 21/22; G08B 21/24; G08B 21/0453; G08B 21/0491; G08B 25/016; G08B 13/19647; B60Q 9/00; B60Q 5/005; B60Q 1/2669; B60Q 1/5037; B60Q 3/267; B60Q 7/00; B60H 1/00735; B60H 1/00742; B60H 1/00778; B60H 1/00978; B60H 1/00; B60H 3/00; E05F 15/40; E05F 15/46; E05F 15/695; E05Y 2400/8505; E05Y 2400/854; E05Y 2400/86; E05Y 2600/45; E05Y 2900/55; E05Y 2201/00; E05Y 2400/00; E05Y 2600/00; E05Y 2800/00; E05Y 2900/00; E05Y 2999/00; B60R 21/01544; B60R 2011/0049; B60R 21/01538; B60R 21/01556; B60R 11/00; B60R 2011/0063; B60R 2022/4808; B60R 2022/4866; B60R 22/48; G01S 13/04; G01S 13/56; G01S 2013/93276; G01S 7/415; G01S 13/0209; G01S 13/50; G01S 13/86; G01S 13/88; G01S 13/931; G01S 19/13; G01S 2013/932; G01S 2013/9322; G01S 2013/93273; G01S 2013/9329; G01S 2205/006; G01S 5/0027; G01S 7/027; G01S 7/41; G01S 1/00; G01S 3/00; G01S 5/00; G01S 7/00; G01S 11/00; G01S 13/00; G01S 15/00; G01S 17/00; G01S 19/00; G01S 2201/00; G01S 2205/00; G06V 20/593; G06V 20/59; G06V 40/10; G06V 40/16; G06V 10/764; G06V 20/597; G06V 40/20; G06V 40/28; G06V 10/00; G06V 20/00; G06V 30/00; G06V 40/00; G06V 2201/00; G01J 5/0025; G01J 2005/0077; G01J 5/025; G01J 5/10; G01J 1/00; G01J 3/00; G01J 4/00; G01J 5/00; G01J 7/00; G01J 9/00; G01J 11/00; B60W 2420/40; B60W 30/08; B60W 10/00; B60W 20/00; B60W 30/00; B60W 40/00; B60W 50/00; B60W 60/00; B60W 2300/00; B60W 2400/00; B60W 2420/00; B60W 2422/00; E05B 77/26; E05B 77/54; G01K 3/10; G01K 3/08; G01K 33/004; G01V 1/001; G01V 1/181; G05D 1/0276; G08G 1/0955; H04L 67/12; A61B 5/0816; A61B 5/1126; A61B 5/113; B32B 17/06; B32B 2307/306; B32B 2605/00; F02N 11/0803; F02N 2200/106; G06F 3/017; H01Q 15/0053; H01Q 15/145; H04N 23/611

USPC .... 340/457, 457.1, 458, 464, 488, 514, 516, 340/539.11, 551, 539.19, 539.13, 539.22, 340/539.21, 553, 555, 556, 557, 578

See application file for complete search history.

(56) References Cited

U.S. PATENT DOCUMENTS

| | | | |
|---|---|---|---|
| 2009/0027188 A1* | 1/2009 | Saban | B60N 2/268 |
| | | | 340/439 |
| 2019/0054841 A1* | 2/2019 | Cech | B60N 2/2806 |
| 2022/0179432 A1* | 6/2022 | Nojoumian | B60N 2/28 |

FOREIGN PATENT DOCUMENTS

| | | |
|---|---|---|
| JP | 2020-144613 A | 9/2020 |
| JP | 2020-149489 A | 9/2020 |
| WO | 2021/124548 A1 | 6/2021 |

* cited by examiner

OCCUPANT-LEFT-UNATTENDED WARNING DEVICE, OCCUPANT-LEFT-UNATTENDED WARNING SYSTEM, AND OCCUPANT-LEFT-UNATTENDED WARNING METHOD

CROSS-REFERENCE TO RELATED APPLICATION

This application is a national stage application, pursuant to 35 U.S.C. § 371, of International Patent Application No. PCT/JP2022/005528, filed Feb. 14, 2022, the entire contents of which are incorporated herein by reference.

TECHNICAL FIELD

The present disclosure relates to an occupant-left-unattended warning technology.

BACKGROUND ART

In recent years, accidents or legal cases caused by leaving unattended in the interior of a vehicle an occupant such as an infant who cannot open and close a door of the vehicle at will have emerged as a social problem. In order to solve this problem, measures have been taken, such as detecting that an occupant is left unattended in the interior of a vehicle to output a warning outside the vehicle in a case where a warning is necessary, and so on.

As a conventional technology in which it is detected that an occupant is left unattended in the interior of a vehicle, and a warning is output, for example, there is a technology disclosed in Patent Literature 1. Patent Literature 1 discloses a system that determines whether or not there is an infant in the interior of a vehicle, and, if so, determines whether or not the infant is at risk on the basis of information obtained from a plurality of sensors such as infrared and ultrasonic sensors to detect whether or not there is an infant in the interior of the vehicle, a sensor to detect a cry of an infant, or a temperature sensor to measure the temperature in the interior of the vehicle, and the system gives a warning in a case where the infant is at risk.

CITATION LIST

Patent Literatures

Patent Literature 1: JP 2000-185609 A

SUMMARY OF INVENTION

Technical Problem

In the technology disclosed in Patent Literature 1, on the basis of the information acquired from the plurality of sensors, it is assessed whether or not an intra-vehicle occupant is an occupant for whom an occupant-left-unattended warning is necessary, and it is determined whether the occupant-left-unattended warning is necessary or unnecessary. However, the technology has a problem that whether the occupant-left-unattended warning is necessary or unnecessary is assessed erroneously in some cases, undesirably. For example, the system makes an erroneous assessment that an adult for whom a warning is not necessary is an infant, in some cases. In this case, an unnecessary warning is output undesirably. On the other hand, the system makes an erroneous assessment that an infant for whom a warning is necessary is an adult in some cases. In this case, a necessary warning is not given.

The present disclosure has been made upon recognition of such a problem, and an object thereof is to provide an occupant-left-unattended warning technology that can reduce erroneous assessments about an occupant-left-unattended warning.

Solution to Problem

An occupant-left-unattended warning device according to an embodiment of the present disclosure includes: processing circuitry to control transmission by a sensor to transmit an electromagnetic wave in an interior, and receive a reception signal based on a reflection wave of the electromagnetic wave received by the sensor;

to estimate whether or not an occupant detected in the interior is a warning-necessitating occupant using a first method on a basis of the received reception signal, assess whether or not it is possible to confirm that the occupant is a warning-necessitating occupant, and output a result of the assessment as an assessment result;

to supplementarily assess whether or not the occupant is a warning-necessitating occupant using a second method different from the first method in a case where it is not possible to confirm that the occupant is a warning-necessitating occupant, and output a result of the supplementary assessment as a supplementary assessment result;

to assess whether an occupant-left-unattended warning is necessary or unnecessary on a basis of the assessment result or the supplementary assessment result; and to control an extra-vehicle output device to give a predetermined warning in a case where it is assessed that the occupant-left-unattended warning is necessary.

wherein the processing circuitry controls an intra-vehicle output device to ask the occupant a question, and supplementarily assesses whether or not the occupant is a warning-necessitating occupant on a basis of a response from the occupant to the question.

Advantageous Effects of Invention

The occupant-left-unattended warning device according to the embodiment of the present disclosure can reduce erroneous assessments about an occupant-left-unattended warning.

DESCRIPTION OF EMBODIMENTS

Figure 1:
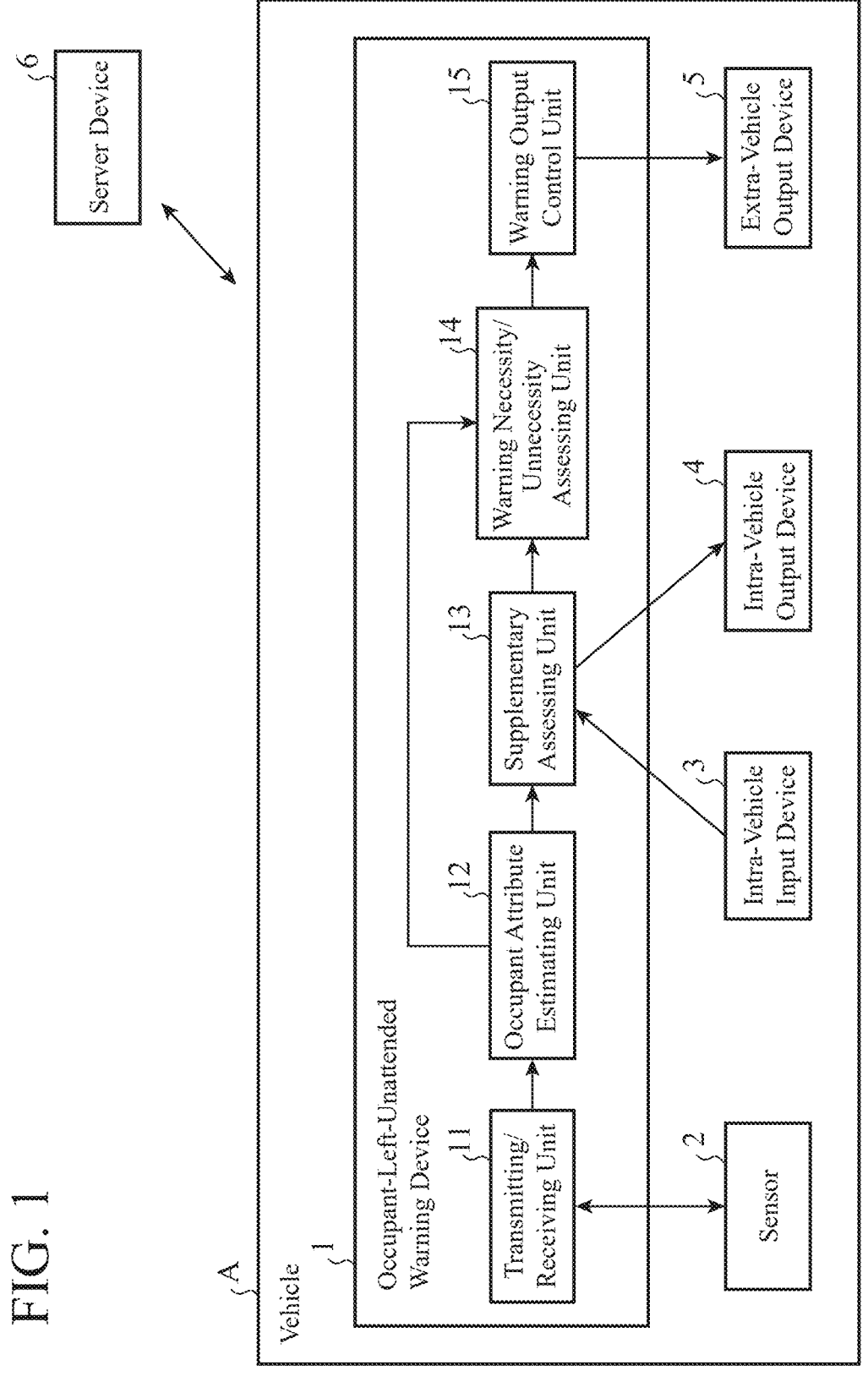
FIG. 1 is a block diagram depicting a configuration example of an occupant-left-unattended warning device and an occupant-left-unattended warning system.

Hereinbelow, various embodiments in the present disclosure are explained in detail with reference to the attached figures. Note that constituent elements in the figures that are given identical or similar reference characters have identical or similar configuration or functions, and overlapping explanations about such constituent elements are omitted.

First Embodiment

<Configuration>

An occupant-left-unattended warning device 1 according to a first embodiment is explained with reference to FIG. 1. FIG. 1 is a block diagram depicting a configuration example of the occupant-left-unattended warning device 1 according to the first embodiment of the present disclosure. As an example, as depicted in FIG. 1, the occupant-left-unattended warning device 1 includes a transmitting/receiving unit 11, an occupant attribute estimating unit 12, a supplementary assessing unit 13, a warning necessity/unnecessity assessing unit 14, and a warning output control unit 15.

The transmitting/receiving unit 11 is connected with a sensor 2. In addition, the supplementary assessing unit 13 is connected with an intra-vehicle input device 3 and an intra-vehicle output device 4. In addition, the warning output control unit 15 is connected with an extra-vehicle output device 5. With such configuration, the occupant-left-unattended warning device 1, the sensor 2, the intra-vehicle input device 3, the intra-vehicle output device 4, and the extra-vehicle output device 5 are included in an occupant-left-unattended warning system which is entirely mounted on a vehicle A.

As another example, some or all of the occupant attribute estimating unit 12, the supplementary assessing unit 13, the warning necessity/unnecessity assessing unit 14, and the warning output control unit 15, which are constituent elements of the occupant-left-unattended warning device 1, may be provided outside the vehicle A. For example, functions of the occupant-left-unattended warning device 1 may be implemented in a server device 6 that is outside the vehicle A. In this case, as an example, the server device 6 receives, from vehicle-mounted communication equipment which is mounted on the vehicle A, but is not depicted, electromagnetic wave reception results from the transmitting/receiving unit 11, and input results from the intra-vehicle input device 3, and replies to the vehicle-mounted communication equipment with warning output information on the basis of the received information. The vehicle-mounted communication equipment outputs the received warning output information to the extra-vehicle output device 5. With such configuration, the occupant-left-unattended warning device 1 and the server device 6 are included in the occupant-left-unattended warning system having the occupant-left-unattended warning device 1 mounted on the vehicle A, and the server device 6 provided outside the vehicle A.

Note that whereas it is assumed that the technology according to the present disclosure is used for the interior of the vehicle A in the example explained in the present disclosure, examples of the vehicle A include also commercial vehicles such as buses or taxis, and railway vehicles such as trains or locomotives, in addition to typical passenger cars. In addition, the technology according to the present disclosure can also be used for the interiors of mobile bodies such as aircrafts, or the insides of rooms having entrances that can be opened and closed, in addition to the interiors of vehicles.

(Transmitting/Receiving Unit)

The transmitting/receiving unit 11 emits an electromagnetic wave toward the interior of the vehicle, and receives a reflection wave of the emitted electromagnetic wave, via the sensor 2. More specifically, the transmitting/receiving unit

11 outputs, to the sensor 2, a control signal for causing the sensor 2 to transmit an electromagnetic wave; the sensor 2 emits an electromagnetic wave following the control signal; the sensor 2 receives a reflection wave of the emitted electromagnetic wave, and outputs a digital reception signal (hereinafter, simply referred to as a reception signal) of the reflection wave; and the transmitting/receiving unit 11 receives the output reception signal.

Examples of the electromagnetic wave include a millimeter wave, an infrared ray, an ultrasonic wave, and visible light, but the electromagnetic wave may be other than these. In addition, the sensor 2 may include a plurality of sensors, and the plurality of sensors may be installed at different positions in the interior of the vehicle. For example, a sensor may be provided for each seat in such a manner that the sensing target area of each sensor covers an occupant seated on one seat.

(Occupant Attribute Estimating Unit 12)

The occupant attribute estimating unit 12 estimates whether or not an occupant detected in the interior of the vehicle is a warning-necessitating occupant using a first method on the basis of the received reception signal, assesses whether or not it is possible to confirm that the occupant is a warning-necessitating occupant, and outputs a result of the assessment as an assessment result. The first method is a method illustrated below which does not use user input such as physique sensing, breathing rate estimation, or age estimation by face recognition. The occupant is typically a human who is in the interior of the vehicle, but may include a non-human animal such as a dog or a cat.

The estimation as to whether or not an occupant in the interior of the vehicle is a warning-necessitating occupant can use various known methods such as physique sensing, breathing rate sensing, or age estimation by face recognition. As an example, in a case where a physique sensing technology is used, a physique can be estimated by representing a monitoring-target space by using a three-dimensional grid map including a plurality of cells, and creating an occupancy grid map representing whether there is a detection-target object on the basis of the reception signal from the transmitting/receiving unit 11. The three-dimensional grid map is stored in advance on a memory which is not depicted, and the occupant attribute estimating unit 12 accesses the memory, acquires the three-dimensional grid map, and creates the occupancy grid map. As an example, in a case where a breathing rate is sensed, a far infrared ray is emitted as the electromagnetic wave emitted to the interior of the vehicle, and a breathing rate is sensed from the fluctuation of luminance in a far infrared image created on the basis of the reflection wave. In a case where the sensed breathing rate is faster than a preset threshold, it is assessed that an occupant is an infant, that is, an occupant for whom a warning is necessary, and in a case where the sensed breathing rate is slower than the threshold, it is assessed that an occupant is an adult, that is, an occupant for whom a warning is not necessary. Note that, as a breathing sensing method, other methods such as a method using a millimeter wave radar which provides a cost advantage, a method in which breathing is sensed from micro motions acquired by a visible light camera, or a method using a pressure sensor installed on a seat may be used. In a case where a face recognition technology is used, an image of the interior of the vehicle is captured by a camera which is not depicted, and image processing is performed on the captured image to perform face recognition. Note that a plurality of methods may be combined to perform the estimation as to whether or not an occupant is a warning-necessitating occupant.

As a result of the estimation as to whether or not there is an occupant, and whether or not an occupant in the interior of the vehicle is a warning-necessitating occupant, not only binary information whether or not an occupant is an occupant for whom a warning is necessary, but also a value representing additional information such as an estimated age or size of the occupant may be output. In addition, in a case where it is difficult to perform the estimation for some reason such as a malfunction of the sensor, a predefined value representing that the estimation could not be performed may be output.

Reliability representing the degree of reliability of a result of the estimation of at least one of an estimation result as to whether or not there is an occupant and an estimation result as to whether or not an occupant is an occupant for whom a warning is necessary may be calculated. As an example, the reliability may be represented by binary information that the reliability is high or low. As another example, the reliability may be represented by a value in a preset range, for example, a value in the range of 1 to 100. As still another example, the reliability may be represented by a numerical value that increases without an upper limit as the degree of reliability increases. In addition, the likelihood or probability of an estimation result may be used as the reliability.

In a method to calculate the reliability, for example, in a case of a method using a breathing rate, the reliability may be determined as being low in a case where the fluctuation of warning necessity/unnecessity assessment results based on a breathing rate in a certain length of time are significant, and the reliability may be determined as being high in a case where the assessment results are stable. Other than this, in a case of a method of assessment based on age estimation by face recognition, the reliability may be determined as being high in a case where the face of an occupant is facing forward, and information used for the age estimation such as contour or parts can be acquired sufficiently, and the reliability may be determined as being low in a case where information about the face is partially missing due to tilting or partial shielding of the face, or the like. In this case, the number of parts about which information could be acquired can also be used directly as reliability.

Furthermore, in a case where the assessment is performed by combining a plurality of methods, the reliability may be determined as being high in a case where the tendencies of estimation results of the respective methods are the same, and the reliability may be determined as being low in a case where the tendencies are different from each other. For example, assuming that there are methods A and B in which the degree to which a warning is necessary or unnecessary is determined at five levels from level 1 to level 5, in a case where the degree is assessed as being "1" by the method A, and the degree of the same tendency as the result of the method A is assessed as being "2" by the method B, the reliability is determined as being "4," which is obtained by subtracting "1," which is the difference between the assessment values of the method A and the method B, from the number of levels "5." On the other hand, in a case where the degree of a different tendency from the result of the method A is assessed as being "5" by the method B, the reliability is determined as being "1," which is obtained by subtracting "4," which is the difference between the assessment values of the method A and the method B, from "5." In this manner, in a case where the tendencies of the respective estimation results are different from each other, the reliability may be determined as being lower as compared with a case where the tendencies are the same.

The occupant attribute estimating unit 12 assesses whether or not it is possible to confirm that an occupant in the interior of the vehicle is a warning-necessitating occupant, and, in a case where it is possible to confirm, transmits an assessment result representing that it is possible to confirm to the warning necessity/unnecessity assessing unit 14. In addition, in a case where it is not possible to confirm, the occupant attribute estimating unit 12 transmits an assessment result representing that it is not possible to confirm to the supplementary assessing unit 13.

A case where it is not possible to confirm that the occupant is a warning-necessitating occupant is a case where there is a fear that an erroneous assessment as to whether a warning is necessary or unnecessary is made if an assessment is made simply on the basis of an estimation result from the occupant attribute estimating unit 12 or a case where the possibility of the erroneous assessment is high, and, for example, a plurality of situations like the following (a) to (c) are possible.

(a) A case where an estimated occupant attribute is close to the borderline that separates a situation where a predetermined warning is necessary from a situation where the predetermined warning is not necessary. For example, in a case where an occupant is assessed as being an adult or an infant on the basis of a physique, and an occupant-left-unattended warning is given in a case of an infant, it is considered that the possibility of an erroneous assessment regarding a physique is high if the physique of the intra-vehicle occupant assessed by the occupant attribute estimating unit 12 is that of an adult with small build which is relatively close to the physiques of infants.

(b) A case where occupant attributes are unknown.

(c) A case where the reliability of a result obtained by the assessment at the occupant attribute estimating unit 12 is low. For example, even in a case where the occupant attribute estimating unit 12 assesses the physique of an occupant as that of an adult with large build which is obviously different from the physiques of infants in the example of (a) described above in which an assessment regarding an occupant-left-unattended warning is made on the basis of physiques, it is considered that the possibility of an erroneous assessment is high in a case where the reliability of the result is low.

Note that (a) to (c) described above are examples, and assessment by the supplementary assessing unit 13 may be implemented in situations other than those described above. In addition, the respective situations described above may be combined, and, for example, an assessment as to whether or not it is possible to confirm that an occupant is a warning-necessitating occupant may be made on the basis of an estimation result of occupant attributes, and reliability thereof. In addition, an assessment as to whether or not it is possible to confirm that an occupant is a warning-necessitating occupant may be made by using a table which is created in advance and represents a relationship between occupant attribute estimation results and whether it is possible or not possible to confirm whether or not an occupant is an occupant for whom a warning is necessary, which relationship is defined on the basis of the examples (a) to (c) described above. Furthermore, a machine learning approach may be used, in which training is performed in advance with, as training data, information about a plurality of attribute assessment results and manually-produced results of determination as to whether confirmation is possible or not possible with the plurality of attribute assessment results, and whether confirmation is possible or not possible is determined on the basis of the training.

An assessment result output from the occupant attribute estimating unit 12 to the warning necessity/unnecessity assessing unit 14 or the supplementary assessing unit 13 may include all or some of information whether or not there is an occupant, an estimation result acquired by the estimation as to whether or not an occupant is a warning-necessitating occupant, and reliability, in addition to an assessment result representing that confirmation is possible or confirmation is not possible. In addition, the assessment result may include information about the number of occupants for whom a warning is necessary and the number of occupants for whom a warning is not necessary.

(Supplementary Assessing Unit)

In a case where the occupant attribute estimating unit 12 cannot confirm that an occupant is a warning-necessitating occupant, the supplementary assessing unit 13 supplementarily assesses whether or not the occupant is a warning-necessitating occupant using a second method different from the first method used by the occupant attribute estimating unit 12, and outputs a result of the supplementary assessment to the warning necessity/unnecessity assessing unit 14 as a supplementary assessment result. The second method is a method by which user input can be accepted. The second method includes a method which can ask a question to receive a response explained below.

As an example, the supplementary assessing unit 13 controls the intra-vehicle output device 4 connected to the supplementary assessing unit 13 to ask the occupant in the interior of the vehicle sensed by the occupant attribute estimating unit 12 a question, and assesses whether or not the occupant is a warning-necessitating occupant on the basis of a response by the occupant to the question accepted via the intra-vehicle input device 3 connected to the supplementary assessing unit 13. In the present disclosure, "on the basis of a response by the occupant" includes also a case where the fact that a reaction by the occupant regarding the necessity or unnecessity for a warning is unknown is taken into consideration, and a case where the fact that there is not a reaction by the occupant regarding the necessity or unnecessity for a warning is taken into consideration, in addition to a case where an explicit response by the occupant regarding the necessity or unnecessity for a warning is taken into consideration.

For example, the question asked through the intra-vehicle output device 4 is asked as a sound output from a speaker, as a question displayed on a display, or as a preset button being flashed, but may be asked by methods other than these. In addition, a plurality of output devices may be used in combination to ask the question.

For example, a response from an intra-vehicle occupant through the intra-vehicle input device 3 is performed by a method such as a sound response via a microphone, touch operation via a touch panel, a gesture via a camera or an infrared sensor, or button operation via an input button, but may be performed by methods other than these. In addition, the occupant-left-unattended warning device 1 may accept a response by using a plurality of input devices in combination.

The question asked to an intra-vehicle occupant is a question that, from content of a response or a reaction from an occupant, enables a determination to be made as to whether or not an occupant-left-unattended warning is required. For example, examples of the question include a direct question like "is a warning necessary?" asking whether an occupant-left-unattended warning is necessary or unnecessary, and a question asking the age of the occupant. In a case where a response intended to mean that a warning is not necessary or a response that enables a determination that a warning is not necessary is obtained from the intra-vehicle occupant to the question, the supplementary assessing unit 13 assesses that the occupant is an occupant for whom a warning is not necessary. On the other hand, in a case that there is a response from the occupant that a warning is necessary or in a case where there is not a response from the occupant, the supplementary assessing unit 13 assesses that the occupant is an occupant for whom a warning is necessary.

Note that, as a supplementary assessment result output from the supplementary assessing unit 13 to the warning necessity/unnecessity assessing unit 14, not only binary information whether or not an occupant is an occupant for whom a warning is necessary, but also a value representing the degree of necessity for a warning may be output. In addition, in a case where it is difficult to make an assessment for some reason such as a malfunction of a sensor, an assessment result from the occupant attribute estimating unit 12 may be output to the warning necessity/unnecessity assessing unit 14.

Note that the supplementary assessing unit 13 may change at least one of the method to ask an intra-vehicle occupant a question and the method to accept a response from the intra-vehicle occupant depending on the position of the intra-vehicle occupant estimated by the occupant attribute estimating unit 12. For example, control may be performed such as displaying and answering questions on an intra-vehicle display closest to an occupant position or narrowing beams for speaker output toward an occupant and for sound input from the occupant.

In a case where the occupant attribute estimating unit 12 can confirm whether or not an occupant is a warning-necessitating occupant, the assessment at the supplementary assessing unit 13 is not implemented, and the process proceeds to the warning necessity/unnecessity assessing unit 14. Thereby, for example, since a question from the supplementary assessing unit 13 and a response from an occupant are not necessary in a case where it is possible to determine that the occupant is obviously an adult for whom a warning is not necessary, the cumbersomeness of warning cancelation in a case where a warning is not necessary can be reduced. On the other hand, in a case where the occupant attribute estimating unit 12 cannot confirm whether or not an occupant is a warning-necessitating occupant, that is, in a case where there is a possibility that an erroneous assessment as to whether a warning is necessary or unnecessary is made or the possibility of the erroneous assessment is high if an assessment is made simply on the basis of an estimation result from the occupant attribute estimating unit 12, errors of occupant-left-unattended warnings can be reduced by additionally implementing the assessment at the supplementary assessing unit 13. In this manner, since the occupant-left-unattended warning device 1 is configured to make the supplementary assessment by the supplementary assessing unit 13 in a case where it is not possible to confirm that an occupant is a warning-necessitating occupant after the assessment by the occupant attribute estimating unit 12 is made, the occupant-left-unattended warning device 1 can reduce erroneous assessments about occupant-left-unattended warnings while reducing the cumbersomeness of warning cancelation in a case where a warning is not necessary.

(Warning Necessity/Unnecessity Assessing Unit)

The warning necessity/unnecessity assessing unit 14 assesses whether an occupant-left-unattended warning is necessary or unnecessary on the basis of an assessment result from the occupant attribute estimating unit 12 or a supplementary assessment result from the supplementary assessing unit 13, and outputs a result of the assessment to the warning output control unit 15. In a case where the occupant attribute estimating unit 12 can confirm that an intra-vehicle occupant is a warning-necessitating occupant, the warning necessity/unnecessity assessing unit 14 assesses whether an occupant-left-unattended warning is necessary or unnecessary on the basis of the result of the assessment at the occupant attribute estimating unit 12. In a case where the occupant attribute estimating unit 12 cannot confirm, the warning necessity/unnecessity assessing unit 14 assesses whether an occupant-left-unattended warning is necessary or unnecessary on the basis of the result of the supplementary assessment at the supplementary assessing unit 13.

The warning necessity/unnecessity assessment result may not only be binary information that a warning is necessary or unnecessary, but also be represented by a value representing the degree of necessity for a warning. For example, the degree of necessity for an occupant-left-unattended warning can be set to "3" in a case where an occupant is an infant, and the intra-vehicle temperature is high or low, to "2" in a case where an occupant is an infant, and the intra-vehicle temperature is moderate, to "2" in a case where an occupant is a child, and the intra-vehicle temperature is high or low, and to "1" in a case where an occupant is a child, and the intra-vehicle temperature is moderate. More simply, the degree of necessity for an occupant-left-unattended warning may be set to "2" in a case where an occupant is an infant, and to "1" in a case where an occupant is a child. Note that in a case where the degree of necessity for an occupant-left-unattended warning is set on the basis of the intra-vehicle temperature, the occupant-left-unattended warning device 1 is connected with a temperature sensor, which is not depicted, to measure the temperature in the interior of the vehicle.

In addition, the warning necessity/unnecessity assessment result may include information about the situation or occupant in the interior of the vehicle acquired at the occupant attribute estimating unit 12 or the supplementary assessing unit 13.

(Warning Output Control Unit)

In a case where the warning necessity/unnecessity assessing unit 14 assessed that an occupant-left-unattended warning is necessary, the warning output control unit 15 controls the extra-vehicle output device 5 capable of giving a warning toward the outside of the vehicle to output a predetermined warning. Warning output methods include flashing a hazard light or sounding a horn, but may be methods other than these. In addition, vehicle control may be performed to open a window, unlock a lock, and so on, or a notification that there is an occupant left unattended in the interior of the vehicle may be given to a mobile information terminal of a person outside the vehicle such as a parent or a driver via a communication line such as the Internet.

In addition, a warning may be output at one level of a plurality of levels depending on an assessment result from the warning necessity/unnecessity assessing unit 14, and the warning output method may be changed depending on the level. For example, in a case where it is determined that an infant is left unattended, and a warning is surely necessary, the volume of a warning sound output to the outside of the vehicle is increased, and so on, in one possible manner. Note that the method and level of a warning may be determined by using a table which is created in advance, and represents a defined relationship between warning necessity/unnecessity assessment results, and warning methods and levels. In addition, information acquired at the occupant attribute estimating unit 12 or the supplementary assessing unit 13 may be notified to the outside of the vehicle.

<Hardware Configuration>

Figure 2A:
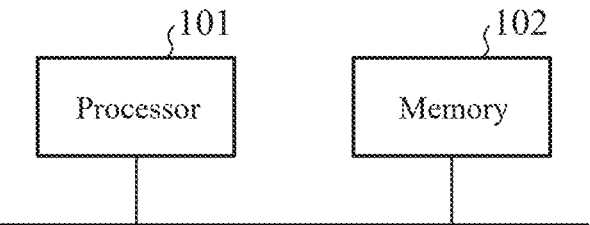
FIG. 2A is a figure depicting a configuration example of hardware of the occupant-left-unattended warning device.

Next, the hardware configuration of the occupant-left-unattended warning device 1 is explained with reference to FIG. 2A and FIG. 2B. As an example, as depicted in FIG. 2A, the occupant-left-unattended warning device 1 is implemented by a computer having a processor 101 and a memory 102. The memory 102 has stored thereon a program for causing the computer to function as the transmitting/receiving unit 11, the occupant attribute estimating unit 12, the supplementary assessing unit 13, the warning necessity/unnecessity assessing unit 14, and the warning output control unit 15. The processor 101 reads out and executes the program stored on the memory 102 to thereby implement functions of the transmitting/receiving unit 11, the occupant attribute estimating unit 12, the supplementary assessing unit 13, the warning necessity/unnecessity assessing unit 14, and the warning output control unit 15.

For example, the processor 101 is configured by using a Central Processing Unit (CPU), a Graphics Processing Unit (GPU), a microprocessor, a microcontroller, a Digital Signal Processor (DSP), or the like.

For example, the memory 102 is configured by using a semiconductor memory such as a Random Access Memory (RAM), a Read Only Memory (ROM), a flash memory, an Erasable Programmable Read Only Memory (EPROM), an Electrically Erasable Programmable Read-Only Memory (EEPROM), or the like, a magnetic disk, an optical disc, a magneto-optical disc, or the like.

Figure 2B:
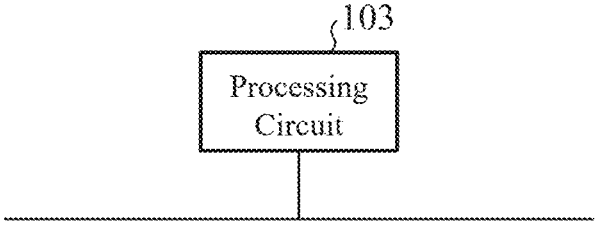
FIG. 2B is a figure depicting a configuration example of hardware of the occupant-left-unattended warning device.

As another example, as depicted in FIG. 2B, the occupant-left-unattended warning device 1 may be implemented by a dedicated processing circuit 103. For example, the processing circuit 103 is configured by using an Application Specific Integrated Circuit (ASIC), a Programmable Logic Device (PLD), a Field-Programmable Gate Array (FPGA), a System-on-a-Chip (SoC), a system Large-Scale Integration (LSI), or the like.

As another example, the occupant-left-unattended warning device 1 may be implemented by using the processor 101, the memory 102, and the processing circuit 103. That is, some functions of the transmitting/receiving unit 11, the occupant attribute estimating unit 12, the supplementary assessing unit 13, the warning necessity/unnecessity assessing unit 14, and the warning output control unit 15 may be implemented by the processor 101 and the memory 102, and the rest functions may be implemented by the processing circuit 103.

In addition, the server device 6 also can be configured as depicted in FIG. 2A or FIG. 2B.

<Operation>

Figure 3:
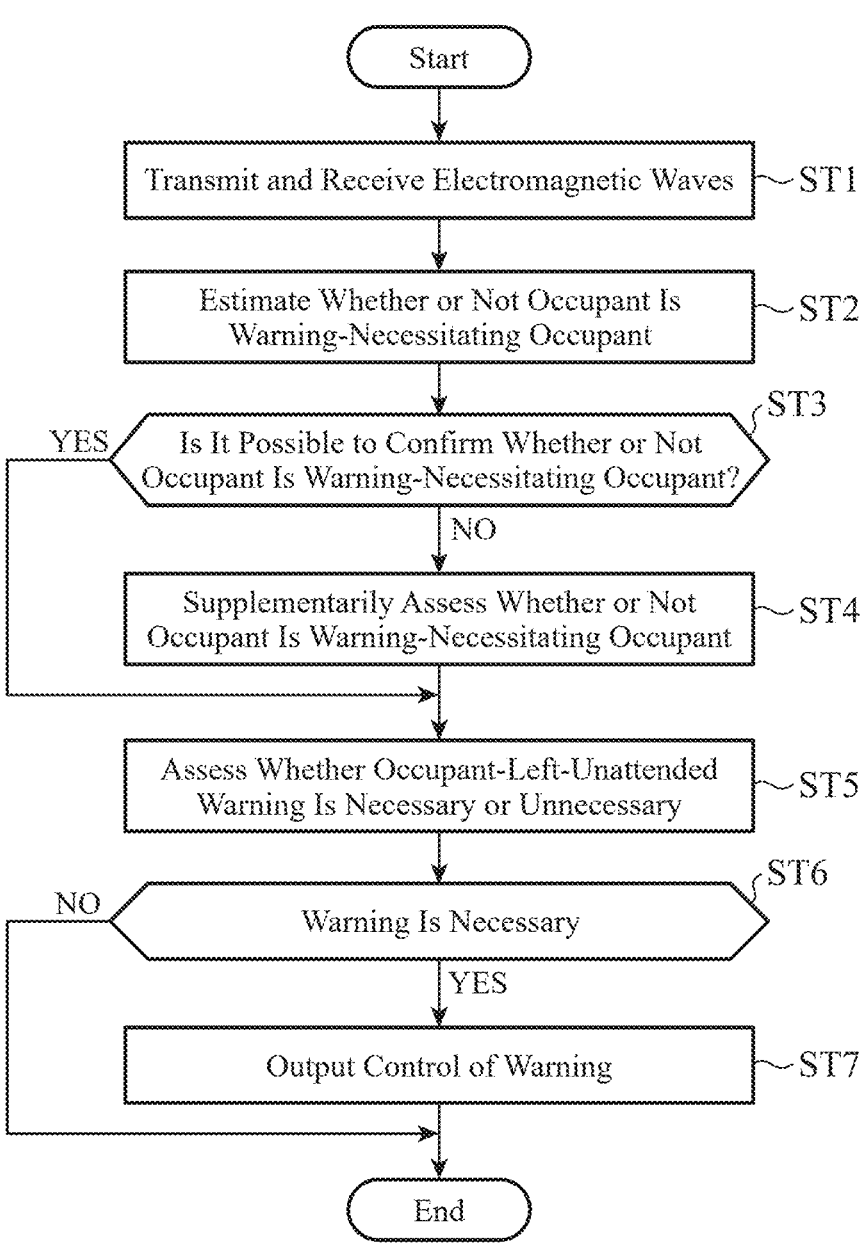
FIG. 3 is a flowchart depicting an operation performed by the occupant-left-unattended warning device.

Next, an operation performed by the occupant-left-unattended warning device 1 is explained with reference to a flowchart depicted in FIG. 3.

At Step ST1, the transmitting/receiving unit 11 emits an electromagnetic wave toward the interior of the vehicle via the sensor 2, and receives a reflection wave of the emitted electromagnetic wave.

Next, at Step ST2, the occupant attribute estimating unit 12 assesses whether or not there is an occupant in the interior of the vehicle on the basis of the reception signal of the reflection wave received by the transmitting/receiving unit 11, and, in a case where there is an occupant, estimates whether or not the occupant is a warning-necessitating occupant.

Next, in a case where the occupant attribute estimating unit 12 cannot confirm whether or not the occupant in the interior of the vehicle is a warning-necessitating occupant at Step ST3, that is, in a case where there is a fear that a result of the assessment at the occupant attribute estimating unit 12 is an erroneous assessment, the process proceeds to a process at the supplementary assessing unit 13 at Step ST4. In a case where it is possible to confirm whether or not the occupant in the interior of the vehicle is a warning-necessitating occupant, the process skips Step ST4, and proceeds to Step ST5.

At Step ST4, the supplementary assessing unit 13 supplementarily assesses whether or not the occupant in the interior of the vehicle is a warning-necessitating occupant on the basis of a question from the occupant-left-unattended warning device 1 using input/output devices (the intra-vehicle input device 3, the intra-vehicle output device 4) in the interior of the vehicle and a response from the occupant, and the result of the estimation at the occupant attribute estimating unit 12.

At Step ST5, on the basis of the result of the assessment at the occupant attribute estimating unit 12, or the result of the supplementary assessment at the supplementary assessing unit 13, the warning necessity/unnecessity assessing unit 14 assesses an occupant-left-unattended warning is necessary or unnecessary. In a case where an assessment result as to whether an occupant-left-unattended warning is necessary or unnecessary represents that a warning is necessary (in a case where the result of Step ST6 is YES), the process proceeds to Step ST7, and the warning output control unit 15 outputs, to the extra-vehicle output device 5, a control signal for causing the extra-vehicle output device 5 to output an occupant-left-unattended warning.

Modification Examples

Even in a case where it is determined at Step ST6 that a warning is not necessary, the process may return to Step ST1 or ST5 again, and the assessment as to whether or not the occupant is a warning-necessitating occupant may be made multiple times. In addition, a condition under which the assessment is to be made multiple times may be that there is a high possibility of an erroneous assessment as to whether or not the occupant is a warning-necessitating occupant at the supplementary assessing unit 13. For example, examples of cases where the assessment is to be made multiple times include a case where, despite the fact that the occupant attribute estimating unit 12 assessed that the occupant is an infant for whom a warning is necessary, a response obtained by the supplementary assessing unit 13 is one intended to mean that a warning is not necessary.

In addition, the occupant-left-unattended warning device 1 may additionally have a function to acquire information about the environment inside the vehicle. For example, by additionally connecting a temperature sensor to measure the temperature in the interior of the vehicle to the occupant-left-unattended warning device 1, the occupant-left-unattended warning device 1 can acquire the degree of risk of the interior of the vehicle. Thereby, even in a case where the warning necessity/unnecessity assessing unit 14 assessed that a warning is not necessary, in a case where it is determined that the occupant is at risk since the temperature in the interior of the vehicle is high, a warning may be output or the supplementary assessing unit 13 may perform an additional process of assessing whether or not the intra-vehicle occupant is a warning-necessitating occupant again, and so on. Thereby, it is possible to ensure higher safety of the intra-vehicle occupant.

In addition, not only the number of times of the assessment, but the timing at which the occupant is asked a question at Step ST4 may be changed depending on the intra-vehicle environment. For example, in an example in which the temperature sensor is added, the supplementary assessing unit 13 may ask a question at a timing at which the temperature in the interior of the vehicle became high, and the occupant-left-unattended warning device 1 determines that the occupant is at risk. In addition, electromagnetic waves may be transmitted and received regularly, and a question may be asked at a timing at which results of the assessment regarding the interior of the vehicle at the occupant attribute estimating unit 12 changed due to some change of the intra-vehicle situation. Examples of the timing at which assessment results from the occupant attribute estimating unit 12 change include a timing at which an occupant entered the interior of the vehicle from the outside of the vehicle, a timing at which the posture of the occupant changed, and the like. Thereby, occupant-left-unattended warnings flexibly coping with changes of the intra-vehicle situation become possible.

Furthermore, the timings or number of times of questions from the supplementary assessing unit 13 to the occupant at Step ST4 may be changed on the basis of positional information about the vehicle A. Laws and regulations regarding occupant-left-unattended warnings differ country by country or region by region. In view of this, information about laws and regulations about a region where the vehicle A is acquired on the basis of positional information about the vehicle A, and the timings and number of times of questions are controlled to comply with rules in the acquired laws and regulations. Thereby, it becomes possible to cope with situations of a plurality of countries or regions adopting different laws and regulations.

SUPPLEMENTARY NOTES

Some aspects of various embodiments explained above are summarized as follows.

Supplementary Note 1

An occupant-left-unattended warning device (1) according to supplementary note 1 includes: a transmitting/receiving unit (11) to control transmission by a sensor to transmit an electromagnetic wave in an interior, and receive a reception signal based on a reflection wave of the electromagnetic wave received by the sensor, an occupant attribute estimating unit (12) to estimate whether or not an occupant detected in the interior is a warning-necessitating occupant using a first method on a basis of the received reception signal, assess whether or not it is possible to confirm that the occupant is a warning-necessitating occupant, and output a result of the assessment as an assessment result; a supplementary assessing unit (13) to supplementarily assess whether or not the occupant is a warning-necessitating occupant using a second method different from the first method in a case where it is not possible to confirm that the occupant is a warning-necessitating occupant, and output a result of the supplementary assessment as a supplementary assessment result; a warning necessity/unnecessity assessing unit (14) to assess whether an occupant-left-unattended warning is necessary or unnecessary on a basis of the assessment result or the supplementary assessment result;

and a warning output control unit (15) to control an extra-vehicle output device to give a predetermined warning in a case where it is assessed that the occupant-left-unattended warning is necessary.

Supplementary Note 2

An occupant-left-unattended warning device according to supplementary note 2 is the occupant-left-unattended warning device according to supplementary note 1, in which the supplementary assessing unit controls an intra-vehicle output device (4) to ask the occupant a question, and supplementarily assesses whether or not the occupant is a warning-necessitating occupant on a basis of a response from the occupant to the question.

Supplementary Note 3

An occupant-left-unattended warning device according to supplementary note 3 is the occupant-left-unattended warning device according to supplementary note 2, in which the response is at least one of a sound response via a microphone, touch operation via a touch panel, a gesture via a camera or an infrared sensor, and button operation via an input button.

Supplementary Note 4

An occupant-left-unattended warning device according to supplementary note 4 is the occupant-left-unattended warning device according to any one of supplementary notes 1 to 3, in which the occupant attribute estimating unit calculates reliability of a result of the estimation, and assesses whether or not it is possible to confirm that the occupant is a warning-necessitating occupant on a basis of at least one of the result of the estimation and the reliability.

Supplementary Note 5

An occupant-left-unattended warning device according to supplementary note 5 is the occupant-left-unattended warning device according to any one of supplementary notes 1 to 4, in which the warning necessity/unnecessity assessing unit further assesses a degree of necessity for an occupant-left-unattended warning on a basis of the assessment result or the supplementary assessment result, and the warning output control unit controls the extra-vehicle output device to change a warning level on a basis of the assessed degree of necessity.

Supplementary Note 6

An occupant-left-unattended warning device according to supplementary note 6 is the occupant-left-unattended warning device according to supplementary note 2, in which at least one of a method to ask the occupant the question and a method of the response from the occupant is changed depending on a position of the occupant.

Supplementary Note 7

An occupant-left-unattended warning device according to supplementary note 7 is the occupant-left-unattended warning device according to supplementary note 2, in which a timing of the question to the occupant or the number of times of the question is changed depending on at least one of an environment inside the vehicle and a location where the vehicle is positioned.

Supplementary Note 8

An occupant-left-unattended warning device according to supplementary note 8 is the occupant-left-unattended warning device according to any one of supplementary notes 1 to 7, in which the first method is a method in which user input is not used, and the second method is a method in which user input can be accepted.

Supplementary Note 9

An occupant-left-unattended warning system according to a supplementary note 9 includes: a server device including at least one of: an occupant attribute estimating unit (12) to estimate whether or not an occupant detected in an interior is a warning-necessitating occupant using a first method on a basis of a reception signal acquired via a sensor to transmit an electromagnetic wave in the interior, and receive a reflection wave, assess whether or not it is possible to confirm that the occupant is a warning-necessitating occupant, and output a result of the assessment as an assessment result; a supplementary assessing unit (13) to supplementarily assess whether or not the occupant is a warning-necessitating occupant using a second method different from the first method in a case where it is not possible to confirm that the occupant is a warning-necessitating occupant, and output a result of the supplementary assessment as a supplementary assessment result; a warning necessity/unnecessity assessing unit (14) to assess whether an occupant-left-unattended warning is necessary or unnecessary on a basis of the assessment result or the supplementary assessment result; and a warning output control unit (15) to control an extra-vehicle output device to give a predetermined warning in a case where it is assessed that the occupant-left-unattended warning is necessary; and an occupant-left-unattended warning device including: a transmitting/receiving unit (11) to control transmission of an electromagnetic wave by the sensor, and receive a reception signal based on the reflection wave of the electromagnetic wave received by the sensor; and a rest of the occupant attribute estimating unit (12), the supplementary assessing unit (13), the warning necessity/unnecessity assessing unit (14), and the warning output control unit (15) which the server device does not include.

Supplementary Note 10

An occupant-left-unattended warning method according to supplementary note 10 is an occupant-left-unattended warning method performed by an occupant-left-unattended warning device including a transmitting/receiving unit (11), an occupant attribute estimating unit (12), a supplementary assessing unit (13), a warning necessity/unnecessity assessing unit (14), and a warning output control unit (15), the occupant-left-unattended warning method including: by the transmitting/receiving unit (11), controlling transmission by a sensor to transmit an electromagnetic wave in an interior, and receiving a reception signal based on a reflection wave of the electromagnetic wave received by the sensor, by the occupant attribute estimating unit (12), estimating whether or not an occupant detected in the interior is a warning-necessitating occupant using a first method on a basis of the received reception signal, assessing whether or not it is possible to confirm that the occupant is a warning-necessitating occupant, and outputting a result of the assessment as an assessment result; by the supplementary assessing unit (13), supplementarily assessing whether or not the occupant is a warning-necessitating occupant using a second method different from the first method in a case where it is not possible to confirm that the occupant is a warning-necessitating occupant, and outputting a result of the supplementary assessment as a supplementary assessment result; by the warning necessity/unnecessity assessing unit (14), assessing whether an occupant-left-unattended warning is necessary or unnecessary on a basis of the assessment result or the supplementary assessment result; and by the warning output control unit (15), controlling an extra-vehicle output device to give a predetermined warning in a case where it is assessed that the occupant-left-unattended warning is necessary.

Note that it is possible to combine embodiments or to modify or omit each embodiment as appropriate.

INDUSTRIAL APPLICABILITY

The occupant-left-unattended warning device 1 of the present disclosure can be used as a warning device that is mounted on a vehicle, assesses whether or not an occupant left unattended in the interior of the vehicle is an occupant for whom a warning is necessary, and controls warnings.

REFERENCE SIGNS LIST

1: occupant-left-unattended warning device; 2: sensor; 3: intra-vehicle input device; 4: intra-vehicle output device; 5: extra-vehicle output device; 6: server device; 11: transmitting/receiving unit; 12: occupant attribute estimating unit; 13: supplementary assessing unit; 14: warning necessity/unnecessity assessing unit; 15: warning output control unit; 101: processor; 102: memory; 103: processing circuit; A: vehicle

The invention claimed is:

1. An occupant-left-unattended warning device comprising:

processing circuitry to control transmission by a sensor to transmit an electromagnetic wave in an interior, and receive a reception signal based on a reflection wave of the electromagnetic wave received by the sensor;

to estimate whether or not an occupant detected in the interior is a warning-necessitating occupant using a first method on a basis of the received reception signal, assess whether or not it is possible to confirm that the occupant is a warning-necessitating occupant, and output a result of the assessment as an assessment result;

to supplementarily assess whether or not the occupant is a warning-necessitating occupant using a second method different from the first method in a case where it is not possible to confirm that the occupant is a warning-necessitating occupant, and output a result of the supplementary assessment as a supplementary assessment result;

to assess whether an occupant-left-unattended warning is necessary or unnecessary on a basis of the assessment result or the supplementary assessment result; and to control an extra-vehicle output device to give a predetermined warning in a case where it is assessed that the occupant-left-unattended warning is necessary, wherein the processing circuitry controls an intra-vehicle output device to ask the occupant a question, and supplementarily assesses whether or not the occupant is a warning-necessitating occupant on a basis of a response from the occupant to the question.

2. The occupant-left-unattended warning device according to claim 1, wherein the response is at least one of a sound response via a microphone, touch operation via a touch panel, a gesture via a camera or an infrared sensor, or button operation via an input button.

3. The occupant-left-unattended warning device according to claim 1, wherein at least one of a method to ask the occupant the question or a method of the response from the occupant is changed depending on a position of the occupant.

4. The occupant-left-unattended warning device according to claim 1, wherein a timing of the question to the occupant or the number of times of the question is changed depending on an environment of the interior.

5. The occupant-left-unattended warning device according to claim 1, wherein the interior is an interior of a vehicle, and a timing of the question to the occupant or the number of times of the question is changed depending on a location where the vehicle is positioned.

6. An occupant-left-unattended warning device comprising:

processing circuitry to control transmission by a sensor to transmit an electromagnetic wave in an interior, and receive a reception signal based on a reflection wave of the electromagnetic wave received by the sensor;

to estimate whether or not an occupant detected in the interior is a warning-necessitating occupant using a first method on a basis of the received reception signal, assess whether or not it is possible to confirm that the occupant is a warning-necessitating occupant, and output a result of the assessment as an assessment result;

to supplementarily assess whether or not the occupant is a warning-necessitating occupant using a second method different from the first method in a case where it is not possible to confirm that the occupant is a warning-necessitating occupant, and output a result of the supplementary assessment as a supplementary assessment result;

to assess whether an occupant-left-unattended warning is necessary or unnecessary on a basis of the assessment result or the supplementary assessment result; and to control an extra-vehicle output device to give a predetermined warning in a case where it is assessed that the occupant-left-unattended warning is necessary, wherein the processing circuitry calculates reliability of a result of the estimation, and assesses whether or not it is possible to confirm that the occupant is a warning-necessitating occupant on a basis of at least one of the result of the estimation or the reliability.

7. An occupant-left-unattended warning device comprising:

processing circuitry to control transmission by a sensor to transmit an electromagnetic wave in an interior, and receive a reception signal based on a reflection wave of the electromagnetic wave received by the sensor;

to estimate whether or not an occupant detected in the interior is a warning-necessitating occupant using a first method on a basis of the received reception signal, assess whether or not it is possible to confirm that the occupant is a warning-necessitating occupant, and output a result of the assessment as an assessment result;

to supplementarily assess whether or not the occupant is a warning-necessitating occupant using a second method different from the first method in a case where it is not possible to confirm that the occupant is a warning-necessitating occupant, and output a result of the supplementary assessment as a supplementary assessment result;

to assess whether an occupant-left-unattended warning is necessary or unnecessary on a basis of the assessment result or the supplementary assessment result; and to control an extra-vehicle output device to give a predetermined warning in a case where it is assessed that the occupant-left-unattended warning is necessary, wherein the first method is a method in which user input is not used, and the second method is a method in which user input can be accepted.

8. An occupant-left-unattended warning system comprising:

a server including:

a first processor to execute a program; and a first memory to store the program which, when executed by the first processor, performs one or more of processes, estimating whether or not an occupant detected in an interior is a warning-necessitating occupant using a first method on a basis of a reception signal acquired via a sensor to transmit an electromagnetic wave in the interior, and receive a reflection wave, assessing whether or not it is possible to confirm that the occupant is a warning-necessitating occupant, and outputting a result of the assessment as an assessment result;

supplementarily assessing whether or not the occupant is a warning-necessitating occupant using a second method different from the first method in a case where it is not possible to confirm that the occupant is a warning-necessitating occupant, and outputting a result of the supplementary assessment as a supplementary assessment result, the supplementary assessing process being performed by controlling an intra-vehicle output device to ask the occupant a question, and by supplementarily assessing whether or not the occupant is a warning-necessitating occupant on a basis of a response from the occupant to the question;

assessing whether an occupant-left-unattended warning is necessary or unnecessary on a basis of the assessment result or the supplementary assessment result; or controlling an extra-vehicle output device to give a predetermined warning in a case where it is assessed that the occupant-left-unattended warning is necessary; and an occupant-left-unattended warning device including:

a transmitter/receiver to control transmission of an electromagnetic wave by the sensor, and receive a reception signal based on the reflection wave of the electromagnetic wave received by the sensor; and a second processor to execute a program; and a second memory to store the program which, when executed by the second processor, performs the rest of the processes.

9. An occupant-left-unattended warning method performed by an occupant-left-unattended warning device, the occupant-left-unattended warning method comprising:

controlling transmission by a sensor to transmit an electromagnetic wave in an interior, and receiving a reception signal based on a reflection wave of the electromagnetic wave received by the sensor;

estimating whether or not an occupant detected in the interior is a warning-necessitating occupant using a first method on a basis of the received reception signal, assessing whether or not it is possible to confirm that the occupant is a warning-necessitating occupant, and outputting a result of the assessment as an assessment result;

supplementarily assessing whether or not the occupant is a warning-necessitating occupant using a second method different from the first method in a case where it is not possible to confirm that the occupant is a warning-necessitating occupant, and outputting a result of the supplementary assessment as a supplementary assessment result, the supplementary assessing process being performed by controlling an intra-vehicle output device to ask the occupant a question, and by supplementarily assessing whether or not the occupant is a warning-necessitating occupant on a basis of a response from the occupant to the question;

assessing whether an occupant-left-unattended warning is necessary or unnecessary on a basis of the assessment result or the supplementary assessment result; and controlling an extra-vehicle output device to give a predetermined warning in a case where it is assessed that the occupant-left-unattended warning is necessary.

* * * * *